April 10, 1956  W. A. WISEMAN  2,741,234
AIRCRAFT ENGINE

Filed April 12, 1954  4 Sheets-Sheet 1

INVENTOR.
WILLIAM A. WISEMAN

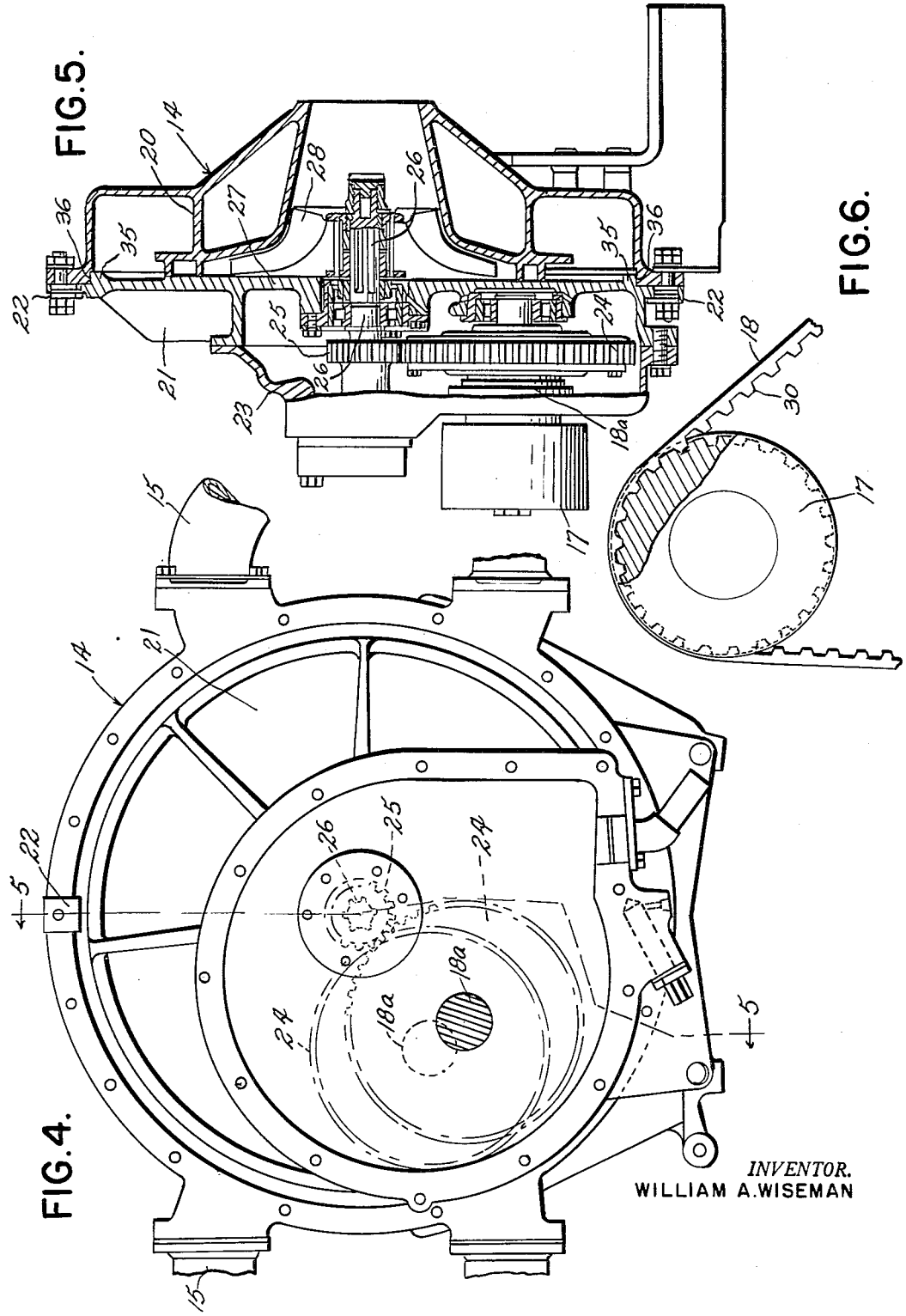

United States Patent Office 2,741,234
Patented Apr. 10, 1956

2,741,234
AIRCRAFT ENGINE

William A. Wiseman, Muskegon, Mich., assignor to Continental Motors Corporation, Detroit, Mich., a corporation of Virginia Application April 12, 1954, Serial No. 422,459

6 Claims. (Cl. 123—119)

My invention relates to supercharged internal combustion engines for aircraft and particularly related to the supercharge and drive therefor.

In the aircraft engine industry it has heretofore been the practice to incorporate a supercharger drive in the engine gear case comprising a gear train for positively connecting the supercharger compressor shaft to a crankshaft drive gear, and thus in the event something goes wrong with the supercharger or drive, complete engine failure is the ultimate result. Furthermore, all such supercharger drive mechanisms are somewhat costly to manufacture and require an engine design of precise clearness and tolerances, and of course with gear trains of this nature we always have noises and extensive lubrication problems with which to contend.

The advantage of a belt driven supercharger was early recognized as being desirable but only after many experiments and failures has such a construction finally been made practical for aircraft engines as many factors had to be carefully worked out in great detail before a solution to the problem was reached. In fact, the assignee corporation herein collaborated with many other airplane companies and belting manufacturers in reaching a practical solution to the problem.

It is an object of the present invention to construct an improved aircraft engine by providing an improved and novel supercharger therefor, and an improved drive for the same.

Other objects will be more apparent as the description progresses, and for a more detailed understanding of the invention, reference may be had to the accompanying drawings illustrating a preferred embodiment thereof in which like characters refer to like parts throughout the several views, and in which Fig. 1 is a plan view of an aircraft engine incorporating a supercharger and improved drive therefor embodying the principles of the invention.

Fig. 4 is an enlarged front elevational view of the supercharger illustrating in dotted lines the adjustment feature.

Fig. 5 is a vertical sectional view of the supercharger taken substantially on the line 5—5 of Fig. 4, and Fig. 6 is an enlarged fragmentary view (partly in section) of the input shaft drive pulley and belt meshing therewith.

Figure 1:
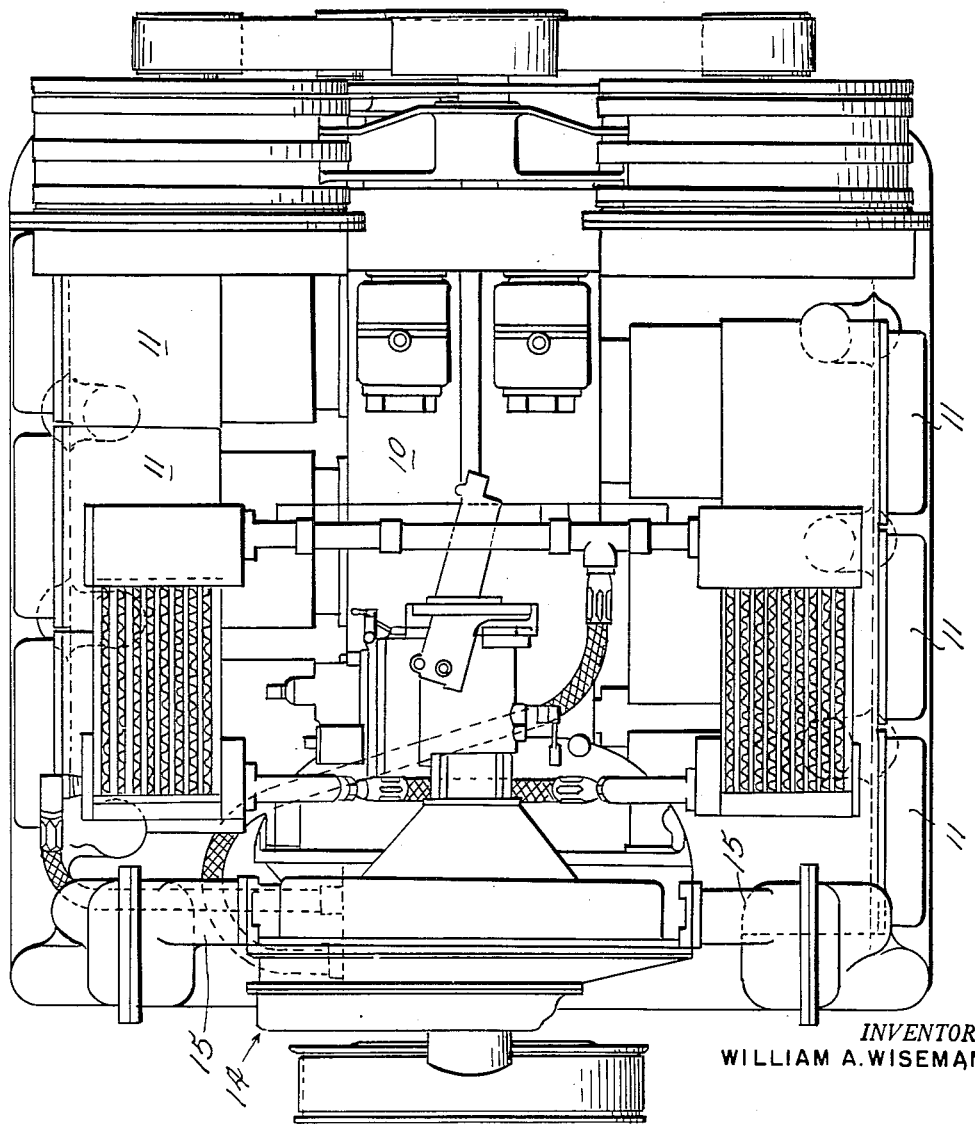
Figure 2:
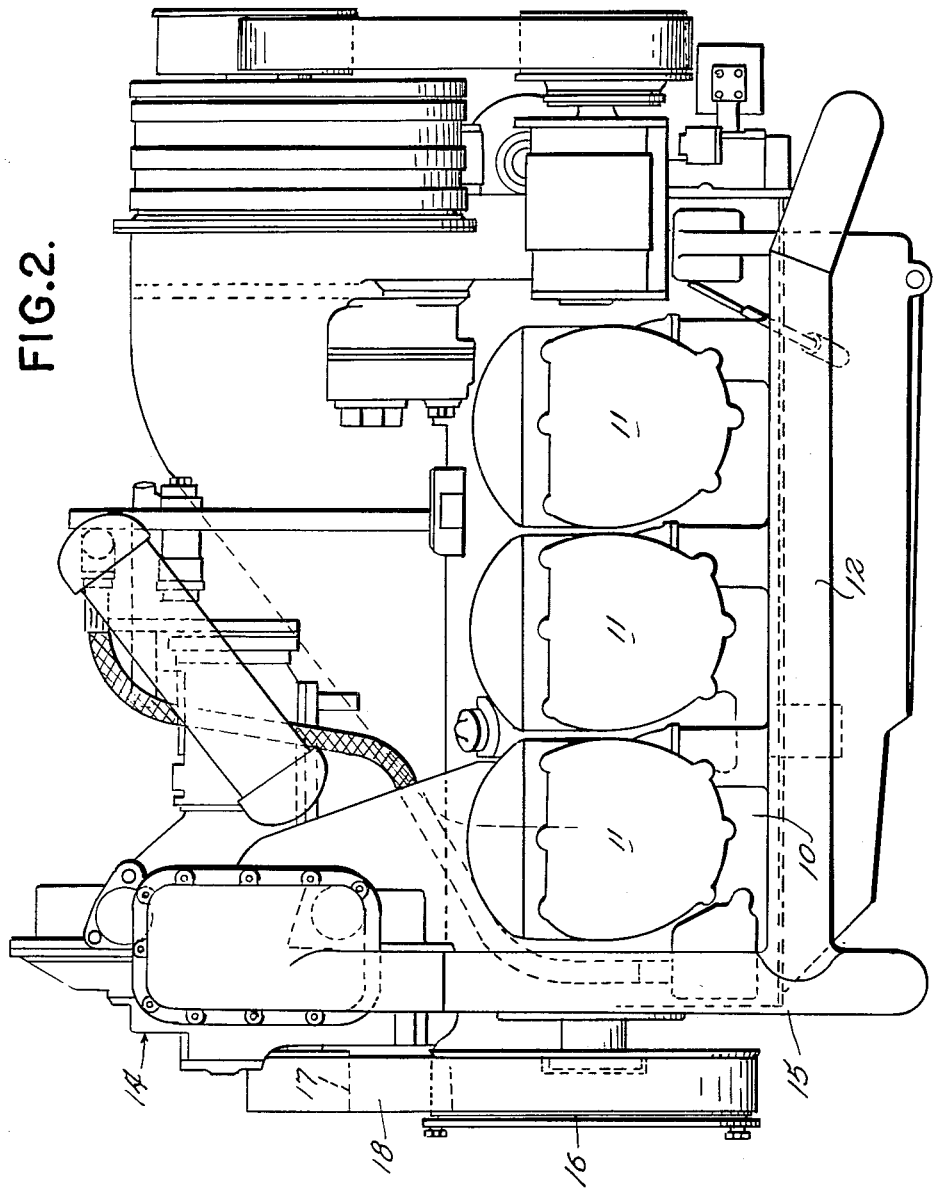
Fig. 2 is a side elevational view thereof.
Figure 3:
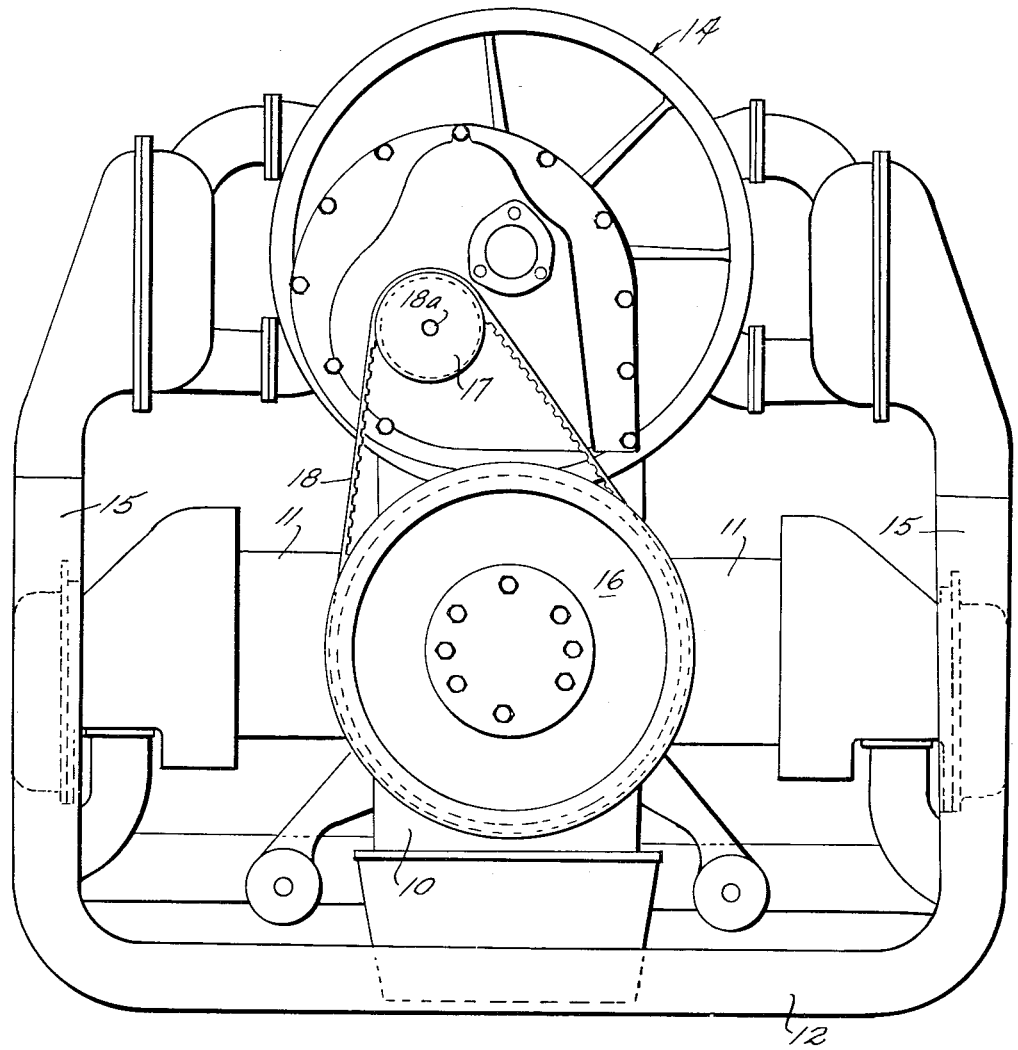
Fig. 3 is a front elevational view thereof.

The aircraft engine for what this supercharger and drive is particularly adapted comprises a horizontally opposed six-cylinder internal combustion engine having a crankcase structure 10, individual cylinders 11, an intake induction manifold 12 leading to said cylinder, a supercharger assembly 14 provided with outlet conduits 15 connected with said intake manifolds 12. The engine is provided with a crankshaft supported by said crankcase and said crankshaft has secured thereon a pulley 16, drivingly connected with the pulley 17 by a belt 18, said pulley 17 being secured on the supercharger input shaft 18a.

The supercharger assembly is mounted on the engine crankcase and comprises a compressor casing 20 and a gear casing 21, said casings being clamped together by clamps 22. Said gear casing has a gear case cover 23 which cooperates with the gear casing to support the said input shaft 18. Gear 24 carried by said input shaft 18 meshes with a smaller gear 25 carried on the compressor shaft 26, both said input and compressor shafts being rotatably supported in suitable bearings carried by the gear case wall 27 (Fig. 5) and a suitable centrifugal compressor 28 is mounted on the rear end of said shaft 26.

The belt 18 driving said input shaft is serrated or toothed as at 30 as shown in Fig. 5 along one face thereof, and these belt teeth mesh with the toothed pulleys 16 and 17.

A simplified means is hereby provided for maintaining said belt tight, and comprises means for angularly adjusting the gear casing with respect to the fixed compressor casing. The clamps 22 may be released and said gear casing rotated clockwise as viewed in Fig. 4 which will move or revolve the input shaft about the compressor shaft to the dotted line position, said gear casing having a pilot flange 35 which is centered in a pilot bore 36 carried by the compressor casing 20, said pilot bore being concentric with respect to the axis of the compressor shaft 26. Thus the gear 24 is merely revolved or oriented about the gear 25 and remains in mesh therewith. When the belt is tight, the clamps 22 are again tightened to lock the two casings together.

A breakage of the belt or jamming of some gear in the supercharger reduction drive mechanisms will not result in engine failure, since the engine is operable without the aid of this supercharger pressure. In the customary supercharger failure will stall the engine with serious consequences in case of an aircraft engine.

Furthermore, the belt drive provides for one speed reduction and a pair of gears in the supercharger gear case provides for the additional multiplication of speed so that it is quite easy to obtain an 8 or 10 to 1 speed ratio between the crankshaft speed and compressor shaft speed.

It will be apparent to those skilled in the art to which this invention pertains that various modifications and changes may be made herein without departing from the spirit of the invention or from the scope of the appended claims.

I claim:

1. In an internal combustion engine, an engine structure having a crankcase and a crankshaft supported thereby, an induction system for said engine, a supercharger assembly associated with said induction system for delivery of air under pressure to said engine induction system, said supercharger assembly including a housing structure comprising a compressor casing and a gear casing, a compressor shaft rotatably supported by said gear casing and having a compressor rotor secured thereon and supported in said compressor casing, reduction gearing supported in said gear casing and comprising a driven gear secured on said compressor shaft and a driving gear, and an input shaft supported by said gear casing and carrying said driving gear, said input shaft offset with respect to said compressor shaft, and means adjustably securing said casings together whereby to provide for an angular adjustment of said gear casing relative to the compressor casing about an axis coextensive with the axis of said compressor shaft.

2. In an internal combustion engine, an engine structure having a crankcase and a crankshaft supported thereby, an induction system for said engine, a supercharger assembly associated with said induction system for delivering air under pressure to said engine induction system, said supercharger assembly including a housing structure comprising a compresser casing and a gear casing, a compressor shaft rotatably supported by said gear casing and having a compressor rotor secured thereon and supported in said compressor casing, reduction gearing supported in said gear casing and comprising a driven gear secured on said compressor shaft and a driving gear, and an input shaft supported by said gear casing and carrying said driving gear, said input shaft offset with respect to said compressor shaft, and means adjustably securing said casings together whereby to provide for an angular adjustment of said gear casing relative to the compressor casing about an axis coextensive with the axis of said compressor shaft, said means comprising a plurality of adjustable clamping means angularly spaced about the periphery of said casings and disposed concentric with respect to the axis of said compressor shaft, whereby relative angular adjustment of said casings will adjustably orient said input shaft about said compressor shaft.

3. In an internal combustion engine, an engine structure having a crankcase and a crankshaft supported thereby, an induction system for said engine, a supercharger assembly associated with said induction system for delivering air under pressure to said engine induction system, said supercharger assembly including a housing structure comprising a compressor casing and a gear casing, a compressor shaft rotatably supported by said gear casing and having a compressor rotor secured thereon and supported in said compressor casing, reduction gearing supported in said gear casing and comprising a driven gear secured on said compressor shaft and a driving gear, and an input shaft supported by said gear casing and carrying said driving gear, said input shaft offset with respect to said compressor shaft, and means adjustably securing said casings together whereby to provide for an angular adjustment of said gear casing relative to the compressor casing about an axis coextensive with the axis of said compressor shaft, said means comprising a plurality of adjustable clamping means angularly spaced about the periphery of said casings and disposed concentric with respect to the axis of said compressor shaft, whereby relative angular adjustment of said casings will adjustably orient said input shaft about said compressor shaft, means driving said input shaft comprising a driving pulley secured to the engine crankshaft, a driven pulley secured on said input shaft, and a flexible belt means drivingly connecting said driving and driven pulleys.

4. In an internal combustion engine, an engine structure having a crankcase and a crankshaft supported thereby, an induction system for said engine, a supercharger assembly associated with said induction system for delivering air under pressure to said engine induction system, said supercharger assembly including a housing structure comprising a compressor casing and a gear casing, a compressor shaft rotatably supported by said gear casing and having a compressor rotor secured thereon and supported in said compressor casing, reduction gearing supported in said gear casing and comprising a driven gear secured on said compressor shaft and a driving gear, and an input shaft supported by said gear casing and carrying said driving gear, said input shaft offset with respect to said compressor shaft, and means adjustably securing said casings together whereby to provide for an angular adjustment of said gear casing relative to the compressor casing about an axis coextensive with the axis of said compressor shaft, said means comprising a plurality of adjustable clamping means angularly spaced about the periphery of said casings and disposed concentric with respect to the axis of said compressor shaft, whereby relative angular adjustment of said casings will adjustably orient said input shaft about said compressor shaft, means driving said input shaft comprising a driving pulley secured to the engine crankshaft, a driven pulley secured on said input shaft, and a flexible belt means drivingly connecting said driving and driven pulleys, said driving and driven pulleys having toothed belt engaging peripheral surfaces, and said belt comprising a complementary notched pulley engaging surface adapted for meshing engagement with said pulley.

5. In an internal combustion engine, an engine structure having a crankcase and a crankshaft supported thereby, an induction system for said engine, a supercharger assembly associated with said induction system for delivering air under pressure to said engine induction system, said supercharger assembly including a housing structure comprising a compressor casing and a gear casing, a compressor shaft rotatably supported by said gear casing and having a compressor rotor secured thereon and supported in said compressor casing, reduction gearing supported in said gear casing and comprising a driven gear secured on said compressor shaft and a driving gear, and an input shaft supported by said gear casing and carrying said driving gear, said input shaft offset with respect to said compressor shaft, and means adjustably securing said casings together whereby to provide for an angular adjustment of said gear casing relative to the compressor casing about an axis coextensive with the axis of said compressor shaft, means driving said input shaft comprising a driving pulley secured to the engine crankshaft, a driven pulley secured in said input shaft, and an endless flexible belt drivingly connecting said driving and driven pulleys, the aforesaid angular adjustment of said gear casing with respect to said compressor casing serving to adjust the slack in said endless belt by relatively adjustment of the linear spacing of said input shaft axis with respect to the crankshaft axis.

6. In an internal combustion engine, an engine structure having a crankcase and a crankshaft supported thereby, an induction system for said engine, a supercharger assembly associated with said induction system for delivering air under pressure to said engine induction system, said supercharger assembly including a housing structure comprising a compressor casing and a gear casing, a compressor shaft rotatably supported by said gear casing and having a compressor rotor secured thereon and supported in said compressor casing, reduction gearing supported in said gear casing and comprising a driven gear secured on said compressor shaft and a driving gear, and an input shaft supported by said gear casing and carrying said driving gear, said input shaft offset with respect to said compressor shaft, and means adjustably securing said casings together whereby to provide for an angular adjustment of said gear casing relative to the compressor casing about an axis coextensive with the axis of said compressor shaft, said means comprising a plurality of adjustable clamping means angularly spaced about the periphery of said casings and disposed concentric with respect to the axis of said compressor shaft, whereby relative angular adjustment of said casings will adjustably orient said input shaft about said compressor shaft, means driving said input shaft comprising a driving pulley secured to the engine shaft, a driven pulley secured on said input shaft, crankshaft, a driven pulley secured on said input shaft, and a flexible belt means drivingly connecting said driving and driven pulleys, said driving and driven pulleys having toothed belt engaging peripheral surfaces, and said belt comprising a complementary notched pulley engaging surface adapted for meshing engagement with said pulley, said belt drive comprising an initial reduction drive between said input and crankshaft shafts and said driving and driven gears in said gear casing providing further reduction drive between said compressor shaft and said input shaft.

No references cited.